United States Patent [19]

Davenport et al.

[11] Patent Number: 5,257,168
[45] Date of Patent: Oct. 26, 1993

[54] PROJECTION HEADLAMP LIGHTING SYSTEM USING A LIGHT CONDUCTOR HAVING STEPPED TERMINATION

[75] Inventors: John M. Davenport, Lyndhurst; Richard L. Hansler, Pepper Pike, both of Ohio

[73] Assignee: General Electric Company, Schenectady, N.Y.

[21] Appl. No.: 982,911

[22] Filed: Nov. 30, 1992

[51] Int. Cl.[5] .......................... F21V 8/00; F21M 3/05
[52] U.S. Cl. ........................................ 362/32; 362/61
[58] Field of Search ................... 362/32, 61, 268, 331

[56] References Cited

U.S. PATENT DOCUMENTS

| | | | |
|---|---|---|---|
| 4,389,698 | 6/1983 | Cibie | 362/32 |
| 4,660,925 | 3/1987 | McCaughan, Jr. | 362/32 |
| 4,811,172 | 3/1989 | Davenport et al. | 362/61 |
| 4,868,718 | 9/1989 | Davenport et al. | 362/32 |
| 4,949,227 | 8/1990 | Finch et al. | 362/61 |
| 4,958,263 | 9/1990 | Davenport et al. | 362/32 |
| 5,101,325 | 3/1992 | Davenport et al. | 362/32 |

*Primary Examiner*—Richard R. Cole
*Attorney, Agent, or Firm*—George E. Hawranko; Stanley C. Corwin

[57] ABSTRACT

A projection headlamp lighting system includes a light source to generate light, a light distributing arrangement to distribute the light to a preselected lighting position, and a light projecting arrangement at the lighting position to project the light in the desired pattern. The light distributing arrangement includes at least one elongated optical light conductor having respective input and output ends. The light projecting arrangement includes an optical structure in the configuration of at least one stair step attached to and protruding axially outwardly from a transverse end face on the output end of the light conductor, and a collector lens being spaced from the outer end of the light conductor. More particularly, the collector lens is spaced from an outer terminal end of the protruding step at a distance substantially equal to the focal length of the lens such that the lens is capable of gathering light projected both from the outer terminal end of the protruding step and the remainder of the output end of the light conductor and projecting the desired light pattern having a first portion focussed by the protruding step and a second portion spread by the remainder of the end face of the light conductor.

18 Claims, 3 Drawing Sheets

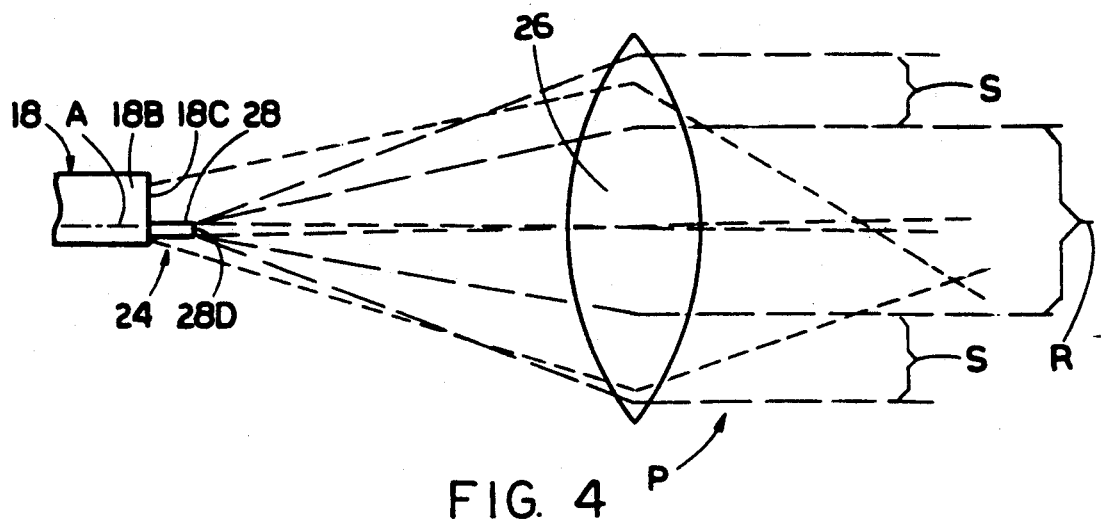
FIG. 4
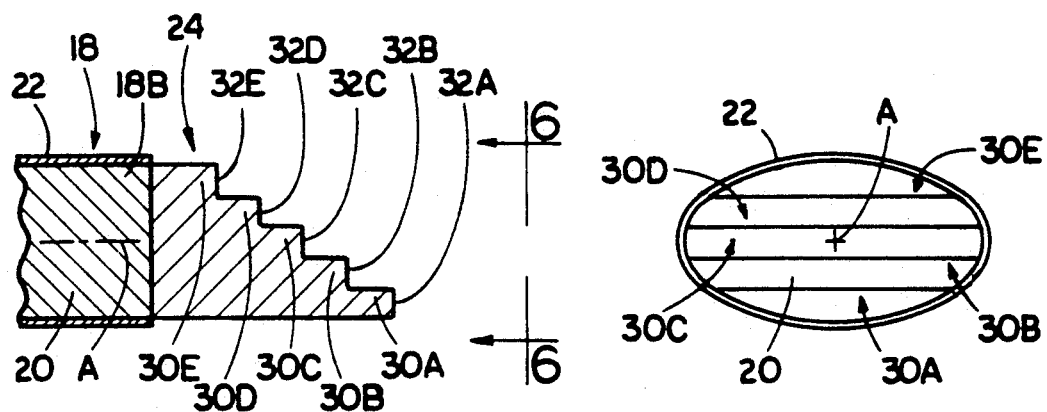
FIG. 5
FIG. 6
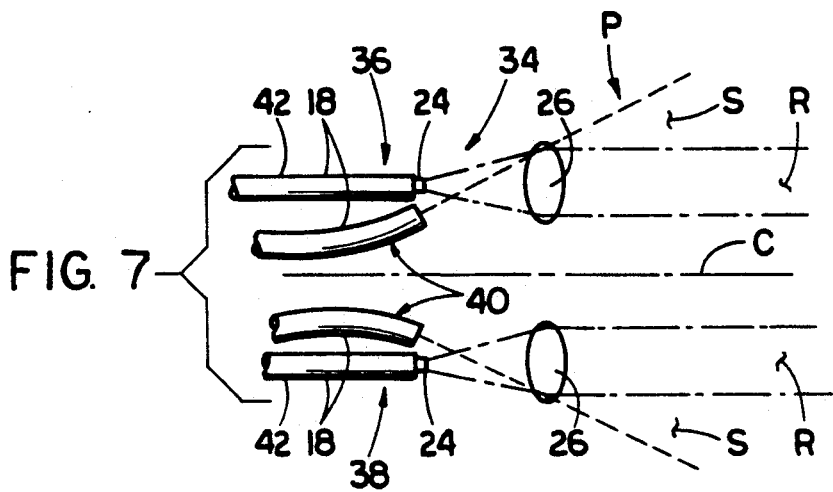
FIG. 7

PROJECTION HEADLAMP LIGHTING SYSTEM USING A LIGHT CONDUCTOR HAVING STEPPED TERMINATION

CROSS-REFERENCE TO A RELATED APPLICATION

Reference is hereby made to the following copending U.S. patent application dealing with related subject matter and assigned to the assignee of the present invention: "Projection Headlamp Lighting System Using Different Diameter Optical Light Conductors" by John M. Davenport et al, assigned U.S. Ser. No. 07/756,663 and filed Sep. 9, 1991 now U.S. Pat. No. 5,184,882.

BACKGROUND OF THE INVENTION

1. Field of the Invention

The present invention relates generally to a projection headlamp system and, more particularly, to one using a light conductor having stepped termination for projecting an improved headlamp light pattern.

2. Description of the Prior Art

It is well known that optical light conductors, such as light guide rods, fibers, or fiber optics, may be used efficiently to carry or conduct the output of a light source to various locations without encountering any substantial transmission losses of the light. The light carried by the optical conductors is confined or condensed to the relatively small dimensions of the conductors themselves and is adaptable for use in various related space restrictive applications in automobiles and aircraft or other vehicles concerned with aerodynamic styling and efficiency.

For example, automotive styling must take into account the amount of frontal area necessary to provide the forward illumination needs for the automobile and provide means to reduce that area, and in particular, the height so as to satisfy aerodynamic considerations. The use of optical light conductors that conduct light within small confines are adaptable to these aerodynamic considerations. Further, optical conductors are advantageously adaptable to provide the overall illumination needs of the vehicle.

To reduce overall space requirements for vehicle forward illumination, one known projection headlamp lighting system employs a remote single central light source to generate light, a light distribution arrangement composed of a plurality of optical light conductors to distribute the light to the various lighting positions, and a light projection arrangement composed of optical elements at the lighting positions to receive the light in the desired pattern. This projection headlamp lighting system is disclosed in U.S. Pat. Nos. 4,811,172 and 4,958,263 issued to Davenport et al and assigned to the same assignee as the present invention. The single central light source can be of the type described in U.S. Pat. No. 4,958,263. The optical light conductors of the distribution arrangement can be a bundle of optical light guide fibers broken out and distributed as necessary. The light projection arrangement of optical elements can be an array of optical connector, lens, and mask elements as described in U.S. Pat. Nos. 4,868,718 and 4,949,227 issued respectively to Davenport et al and Finch et al and assigned to the same assignee as the present invention.

The basic difference between this projection headlamp system using the remote central light source and the traditional headlamp systems is that the end of the light conductor is uniformly bright, whereas in a traditional system there is a brightness gradient from the center of the image of the light source outward to the edge thereof. When the uniformly bright end of the light conductor is imaged on the road, the portion of the image close to the vehicle is too small and too bright while the portions further away are not bright enough.

Consequently, there is a need to improve the projection headlamp system utilizing the remote central light source so as to provide an improved light distribution pattern.

SUMMARY OF THE INVENTION

The present invention provides a headlamp projection system designed to satisfy the aforementioned needs. The headlamp projection system of the present invention basically employs a light conductor having stepped termination for projecting an improved headlamp light distribution pattern which provides a wider, less bright pattern in the area near the front of the vehicle and high brightness in the area further down the road, without causing glare in the eyes of the oncoming driver.

Accordingly, the present invention is directed to a headlamp projection lighting system. The system comprises: (a) means for generating light; (b) means for receiving the light from the generating means and for distributing the light to a preselected lighting position, the light distributing means including at least one elongated optical light conductor having respective input and output ends; and (c) means for receiving the light at the preselected lighting position from the output end of the optical light conductor and being operable for projecting the light therefrom in a desired light pattern.

More particularly, the light receiving and projecting means includes an optical structure and an optical lens. The optical structure has a configuration of at least one step attached to and protruding axially outwardly from an end face on the output end of the light conductor. The optical lens is spaced from the outer end of the light conductor. The lens also is spaced from an outer terminal end of the protruding step at a distance substantially equal to a focal length of the lens such that the lens is capable of gathering light projected from the output end of the light conductor and from the optical structure. From the gathered light, the lens projects a desired light pattern having a first portion focussed by the optical structure and a second portion widely spread by the end face of the light conductor and the lens.

Further, the protruding step may be fabricated of a quartz material and may have a rectangular configuration in cross-section. The end face on the output end of the light conductor has an oval configuration and is fabricated of a plastic material.

Alternatively, the optical structure can have a configuration of a plurality of steps attached to and protruding axially outwardly from the end face on the output end of the light conductor. Each step has a terminal end disposed at a different distance from the outer end of the optical conductor. The steps are in a series being located progressively farther away from the end face of the optical conductor. Preferably, in one embodiment, the one step located farthest from the light conductor end face is also located nearest to the focal length so that an intense light is focussed at the largest distance. The other steps are progressively closer to the outer end of the light conductor and progressively farther away from the lens. These other steps are increasingly out of focus so that the light from the remaining steps is spread out increasing such that their images can fill in the foreground in front of the vehicle.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 4 is an enlarged fragmentary schematically illustrated side elevational view of the optical light conductor, structure and lens of the system of FIG. 1.

FIG. 5 is a fragmentary schematically illustrated axial sectional view of an alternative embodiment of the outlet end of the optical light conductor.

FIG. 6 is a schematically illustrated front elevational view of the output end of the optical light conductor of the system as seen along line 6—6 of FIG. 1.

FIG. 7 is a schematically illustrated top plan view of right and left projection headlamp systems employing the features of the present invention.

DETAILED DESCRIPTION OF THE INVENTION

Figure 1:
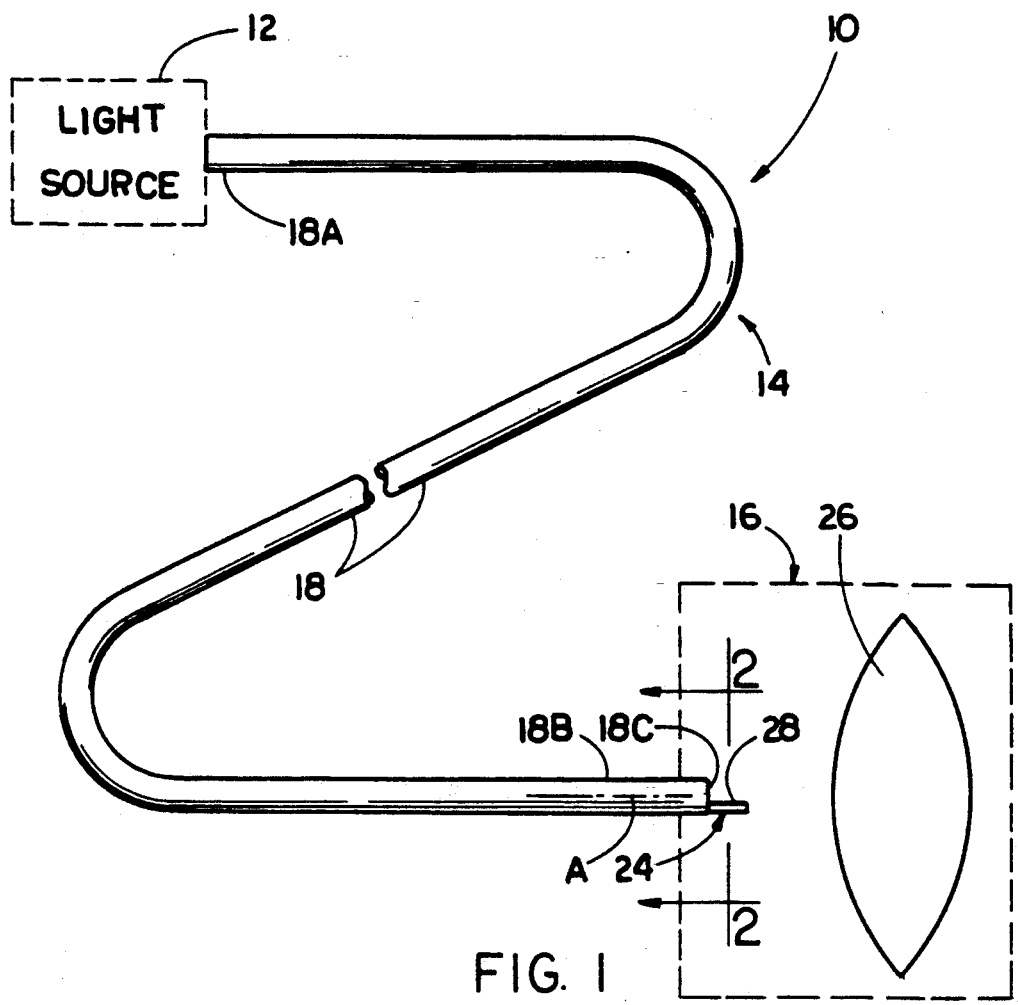
FIG. 1 is a schematically illustrated elevational view of a projection headlamp lighting system in accordance with the present invention.
Figure 2:
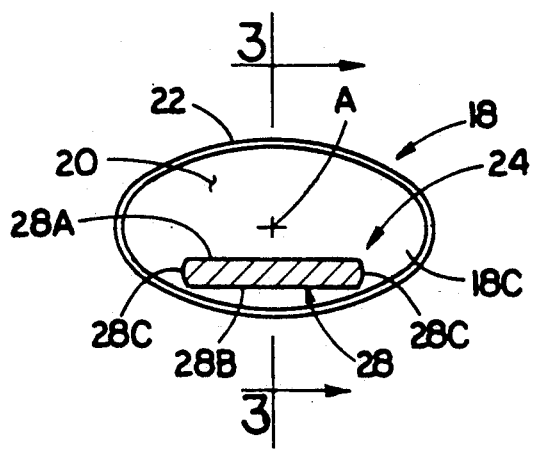
FIG. 2 is an enlarged schematically illustrated front elevational view of the output end of the optical light conductor of the system as seen along line 2—2 of FIG. 1.
Figure 3:
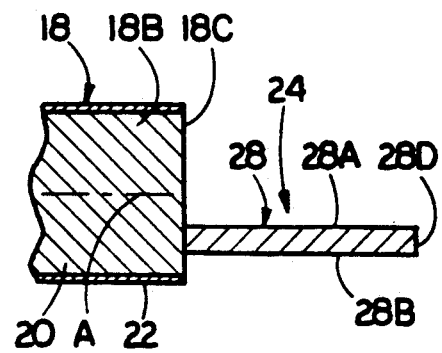
FIG. 3 is a fragmentary schematically illustrated axial sectional view of one embodiment of an outlet end of the optical light conductor taken along line 3—3 of FIG. 2.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms and relate to the applications of this invention in a vehicle.

Figure 8:
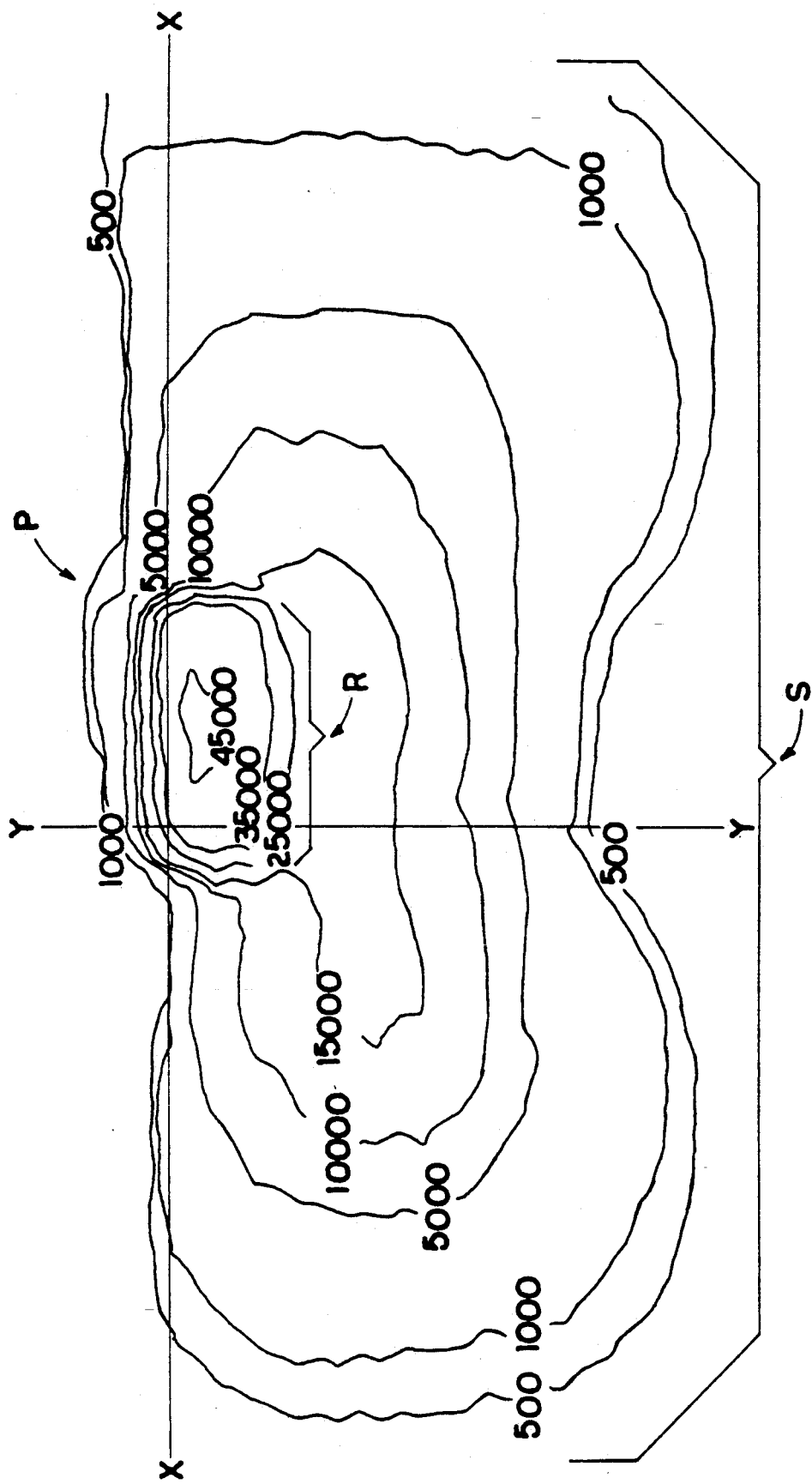
FIG. 8 is a graph depicting the configuration and intensity of the light distribution pattern projected by the projection headlamp system of FIG. 4.

Referring now to the drawings, and particularly to FIG. 1, there is illustrated a projection headlamp lighting system, generally designated 10, in accordance with the present invention. Basically, the projection headlamp lighting system 10 includes means 12 for generating light, means 14 for receiving the light from the generating means 12 and distributing or carrying the light to a preselected lighting position, and means 16 for receiving the light at the preselected position from the light distributing means 14 and projecting the light in a desired non-symmetric light distribution pattern P (FIG. 8) for a low beam application. It should be understood here that the principles of the present invention are equally applicable for projecting the light in a desired symmetric light pattern (not shown) for a high beam application.

The light generating means 12 of the projection headlamp system 10 can take any suitable form. One suitable example is the arrangement described in the copending U.S. patent application cross-reference above, the disclosure of which is incorporated herein by reference thereto. The light distributing means 14 of the projection headlamp system 10 preferably includes at least one elongated optical light conductor 18 having opposite input and output ends 18A, 18B. The light conductor 18 has an inner optical core 20 of light conducting material and an outer thin protective coating 22.

The light projecting means 16 of the projection headlamp system 10 preferably includes an optical structure 24 on the outlet end 18B of the light conductor 18 and an optical collector lens 26 spaced from the outlet end 18B of the light conductor 18. The optical structure 24 is attached to and protrudes axially outwardly from an end face 18C on the output end 18B of the light conductor 18. The optical structure 24 is attached to the light conductor end face 18C by being integrally formed on the outlet end 18B of the light conductor 18 or by being bonded thereon using a suitable adhesive, such as an index matching clear cement. Also, the optical structure 24 is offset from a longitudinal axis A of the light conductor 18 at the outlet end 18B thereof. Further, the optical structure 24 is fabricated of a suitable material, such as the same material as the light conductor 18 or a quartz material, and has a generally rectangular configuration in cross-section. In the illustrated embodiment, the output end 18B of the light conductor 18, and thus the end face 18C thereon, have a generally oval cross-sectional configuration, and the core 20 of the light conductor 18 is fabricated of a suitable plastic material.

Referring to the embodiment of FIGS. 1-4, the optical structure 24 has the configuration of a single stair step 28 attached to and protruding axially outwardly from the light conductor end face 18C. More particularly, the protruding step 28 has a pair of spaced top and bottom surfaces 28A, 28B and a pair of opposite side surfaces 28C extending between and interconnecting the top and bottom surfaces 28A, 28B. The top and bottom surfaces 28A, 28B extend generally perpendicular to the opposite side surfaces 28C; however, all of the top, bottom and side surfaces 28A, 28B, 28C extend generally parallel to or along the longitudinal axis A of the light conductor 18 at the outlet end 18B thereof. The protruding step 28 further has a terminal end surface 28D extending between and interconnecting outer edges of the top, bottom and side surfaces 28A, 28B, 28C. The terminal end surface 28D extends generally perpendicular or transverse to the longitudinal axis A of the light conductor 18.

The optical collector lens 26 of the light projecting means 16 has a given or known focal length and is spaced from the outer or terminal end surface 28D of the protruding step 28 at a distance substantially equal to the focal length of the collector lens 26 such that the end surface 28D is located adjacent a focal point of the lens 26. In such arrangement of the collector lens 26 with the protruding step 28, the lens 26 is capable of gathering light projected from the output end 18B of the light conductor 18 and from the protruding step 28. As seen in the light intensity and distribution graph of FIG. 8, the collector lens 26 projects a desired light distribution pattern P having a smaller first portion R, or a "punch" of light, focussed by the protruding step 28 and a larger second portion S, or a "spread" of light, projected by the remainder of the end face 18C of the light conductor 18.

Referring to FIGS. 5 and 6, as an alternative embodiment, the optical structure 24 can also have the configuration of multiple stair steps 30A, 30B, 30C, 30D, 30E formed integrally with one another and attached to and protruding axially outwardly from the end face 18C on the output end 18B of the light conductor 18. The protruding steps 30A-30E have respective terminal end surfaces 32A-32E disposed at different distances from the outer end 18B of the optical conductor 18. The protruding steps 30A-30E form a series extending progressively farther away from the end face 18C of the optical conductor 18. In the preferred embodiment, the longest one of the steps 30A, being substantially the same as the single step 28 of the embodiment of FIGS. 1-4, extends farthest from the light conductor end face 18C and its end surface 32A is located nearest to the collector lens 26, specifically at a distance equal to the focal length of the lens 26 so that it is located adjacent to the focal point of the lens. An image of the intense light portion R projected from the one step 30A is focussed by the lens 26 at a far distance from the lens 26. The other shorter steps 30B-30E extend progressively shorter distances from the outer end 18B of the light conductor 18 so that their end surfaces 32B-32E are located progressively farther away from the collector lens 26. Thus, these other steps 30B-30E are increasingly out of focus so that the images of light from these remaining steps increasingly spreads out to provide the larger portion S of the light which fills in the foreground in front of the vehicle.

One example of a suitable multi-step optical structure 24 is as follows. For a light conductor 18 having a twelve millimeter diameter and a collector lens 26 having a sixty-six millimeter focal length, the steps 30A-30E extend six millimeter in length beyond one another. This gives a light distribution pattern P that is approximately 2 meters in width and extend 2.34 meters in front of the vehicle. The oval cross-sectional configuration of the light conductor 18 gives sharper upper and lower cutoffs in the pattern P. The light needed to fill-in the half degree above the horizontal X in FIG. 8 on the right side of the highway is provided by the light most tightly focussed and collimated by the lens being projected from the longest bottom step 30A which provides the smaller distant portion R of the light pattern. The remaining steps 30B-30E, progressing upwardly from the bottom step 30A, project the second light portion S which progressively spreads and diminishes outwardly and downwardly on both sides of the highway filling in the foreground directly in front of the vehicle.

As a further alternative embodiment, not shown, the optical structure 24 seen in FIGS. 5 and 6 could be inverted in thereby reversing the positions of the steps 30A-30E such that the longest step 30A would be located at the top of the figure whereas the shortest step 30E would be located at the bottom of the figure. Again, in such alternative arrangement, any one of the steps 30A-30E could be located adjacent the focal point of the lens 26 so that the light projected from this step is focussed whereas the light projected from the other remaining steps are out of focus and thereby produce a spread light. However, it is preferred in such alternative embodiment that the shortest step 30E be located adjacent to the focal point of the lens 26 in providing the intense focussed light whereas the other remaining progressively longer steps 30A-30D would be located progressively closer to the collector lens 26 and thus out of focus in thereby producing the spread light.

Referring to FIG. 7, there is illustrated a headlight system 34 incorporating the projection headlamp system 10 of the present invention. The headlight system 34 includes left and right headlights 36, 38 on opposite sides of a centerline C. The left and right headlights 36, 38 include respective outer headlamp arrangements 42 which utilize the above-described optical single or multi-step structure 24 for projecting the main distantly-focussed ("punch") portion R of the light distribution pattern P, and respective inner headlamp arrangements 40 which do not utilize the optical single or multi-step structure 24 and so only project the "spread" light portion S of the pattern P. Of course, in accordance with the present invention, the left and right headlights 36, 38 can be respective single headlamp arrangements which project both the focussed and spread portions of the pattern.

By utilizing the principles of the present invention, the projection headlamp system 10 is capable of being reduced in size by scaling down the size of both the light conductor 18 and the projection collector lens 26. Both the diameter and focal length of the lens 26 may be reduced. In this case the lengths, widths, and heights of the steps 30 may also be reduced proportionately.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:
1. A projection headlamp system, comprising:
   (a) means for generating light;
   (b) means for receiving the light from said generating means and for distributing the light to a preselected lighting position, said light distributing means including at least one elongated optical light conductor having respective input and output ends; and
   (c) means for receiving the light at said preselected lighting position from said output end of said optical light conductor and being operable for projecting the light therefrom in a desired light pattern;
   (d) said light receiving and projecting means including
      (i) an optical structure in a configuration of at least one step attached to and protruding axially outwardly from an end face on said output end of said light conductor, and
      (ii) an optical lens being spaced from said outer end of said light conductor, said lens also being spaced from an outer terminal end of said protruding step at a distance substantially equal to a focal length of said lens such that said outer terminal end of said step of said structure is at a distance from said lens substantially equal to said focal length of said lens such that said lens is capable of gathering light projected from said output end of said light conductor and from said optical structure and of producing said desired light pattern having a first portion focussed by said optical structure and a second portion widely spread by said end face of said light conductor.

2. The system as recited in claim 1, wherein said protruding step has a rectangular configuration in cross-section.

3. The system as recited in claim 1, wherein said protruding step is offset from a longitudinal axis of said light conductor at said outlet end thereof.

4. The system as recited in claim 1, wherein said protruding step has a pair of spaced top and bottom surfaces extending substantially parallel to a longitudinal axis of said light conductor at said outlet end thereof and a terminal end surface extending between and interconnecting outer edges of said top and bottom surfaces and extending substantially perpendicular to said longitudinal axis of said light conductor at said outlet end thereof.

5. The system as recited in claim 1, wherein said end face on said output end of said light conductor has an oval configuration.

6. The system as recited in claim 1, wherein said optical structure has a configuration of a plurality of steps attached to and protruding axially outwardly from said end face on said output end of said light conductor, each of said steps has a terminal end being disposed at a different distance from said outer end of said optical conductor.

7. The system as recited in claim 6, wherein said steps are in a series extending progressively farther away from said end face of said optical conductor.

8. The system as recited in claim 7, wherein one of said steps located farthest from said light guide end face is also located nearest to a focal point of said lens so that an image of an intense light is focussed by said lens at a far distance away from said lens.

9. The system as recited in claim 8, wherein the other steps by being progressively closer to said outer end of said light conductor are progressively farther away from said lens and so are increasingly out of focus such that the light from said other steps is increasingly spread out.

10. The system as recited in claim 6, wherein one of said steps is located adjacent to the focal point of said lens so that the light projected by said one step is focussed by said lens.

11. A projection headlamp lighting system, comprising:
(a) a light source to generate light;
(b) a light distributing arrangement to receive and distribute the light to a preselected lighting position, said light distributing arrangement including at least one elongated optical light conductor having respective input and output ends; and
(c) a light projecting arrangement at said lighting position to receive and project the light in a desired pattern, said light projecting arrangement including
(i) an optical structure in a configuration of at least one step attached to and protruding axially outwardly from a transverse end face on the output end of the light conductor, and
(ii) a collector lens being spaced from said outer end of said light conductor, said lens also being spaced from an outer terminal end of said protruding step at a distance substantially equal to a focal length of said lens such that said lens is capable of gathering light projected both from said outer terminal end of said protruding step and a remainder of said end face on said light conductor and of projecting the desired light pattern having a first portion focussed by said protruding step and a second portion spread by said remainder of said end face on said light conductor.

12. The system as recited in claim 11, wherein said protruding step is offset from a longitudinal axis of said light conductor at said outlet end thereof.

13. The system as recited in claim 11, wherein said protruding step has a pair of spaced top and bottom surfaces extending substantially parallel to a longitudinal axis of said light conductor at said outlet end thereof and a terminal end surface extending between and interconnecting outer edges of said top and bottom surfaces and extending substantially perpendicular to said longitudinal axis of said light conductor at said outlet end thereof.

14. The system as recited in claim 11, wherein said optical structure has a configuration of a plurality of steps attached to and protruding axially outwardly from said end face on said output end of said light conductor, each of said steps has a terminal end being disposed at a different distance from said outer end of said optical conductor.

15. The system as recited in claim 14, wherein said steps are in a series extending progressively farther away from said end face of said optical light conductor.

16. The system as recited in claim 15, wherein said one of said steps extending farthest from said light conductor end face is also located nearest to a focal point of said lens so that an intense light is focussed at the farthest distance from said lens.

17. The system as recited in claim 16, wherein said other steps by being progressively closer to said outer end of said light conductor are progressively farther away from said lens and so are increasingly out of focus such that the light from said remaining steps is increasingly spread out.

18. The system as recited in claim 14, wherein one of said steps is located adjacent to the focal point of said lens so that the light projected from said one step is focussed by said lens; and wherein the other ones of said steps are located away from the focal point of said lens such that the light projected from said other steps is out of focus and spreads out.

* * * * *